UNITED STATES PATENT OFFICE.

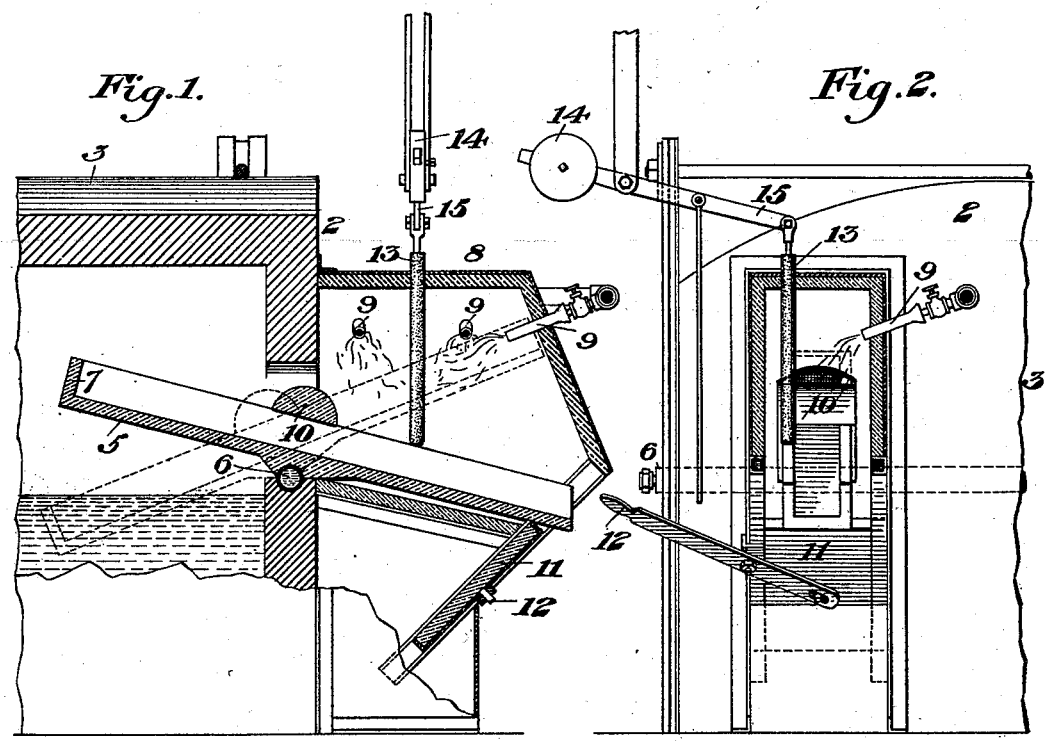

WILLIAM BUTTLER, OF REDKEY, INDIANA.

GLASS-MELTING FURNACE.

SPECIFICATION forming part of Letters Patent No. 624,290, dated May 2, 1899.

Application filed January 5, 1898. Serial No. 665,647. (No model.)

*To all whom it may concern:*

Be it known that I, WILLIAM BUTTLER, of Redkey, in the county of Jay and State of Indiana, have invented a new and useful Improvement in Glass-Melting Furnaces, of which the following is a full, clear, and exact description, reference being had to the accompanying drawings, forming part of this specification, in which—

Figure 1 is a side elevation, partly broken away, of the end portion of one form of my improved tank-furnace for melting glass. Fig. 2 is a front elevation of the same with the protecting-hood broken away. Fig. 3 is a view similar to Fig. 1, showing another form of my invention; and Fig. 4 is a perspective view showing the trough of Fig. 3 with its burner.

My invention relates to furnaces for melting glass, and is designed to provide an improved construction of the same whereby the glass may be drawn therefrom in the desired quantities in a rapid, cheap, and easy manner.

In the drawings, referring to the form of Figs. 1 and 2, 2 represents the end wall of a tank-furnace 3, this end wall having a hole 4, within which is arranged an oscillatory swinging trough 5. This trough is preferably made of fire-clay or suitable refractory composition, and its bottom is provided with a central transverse groove, which may rest upon a water-cooled pipe 6, extending across the bottom of the hole in the furnace-wall. The inner end of this trough is closed by an end wall 7, while its outer end is open. That portion of the trough external to the furnace is preferably surrounded by a hood 8, lined with a suitable refractory material and through which may project a series of gas-jets 9, which serve to keep the outer portion of the trough at a proper temperature. The trough is provided at a point over its pivot with a weight 10 and normally lies in the position shown in dotted lines in Fig. 1, with its inner end in the bath of glass. When the trough is in this position, its outer end is closed in by the hood, which hood is provided at its lower portion with a sliding door 11, operated by a handle 12. To depress the outer portion of the trough and swing it into position shown in full lines in Fig. 1, I use the vertical pusher 13, which contacts with the edge portion of the trough and is normally held elevated by a counterweight 14 at the outer end of the lever 15, to which this pusher is pivotally connected. A handle 16 depends from the lever, and by pulling down upon this handle the pusher is forced against the trough, which is swung into position shown in full lines in Fig. 1, sliding door 11 having been opened either before or by means of the downward movement of the trough.

The operation of the device will be apparent. When it is desired to obtain a portion of glass, the handle 16 is pulled down, so as to elevate the inner end of the trough, the glass in which will flow down and out at its open front end, which glass may be cut off when the desired quantity is obtained and the trough then swung back to its original position. This reverse movement of the trough can be obtained by closing the door 11, the weight 10 also aiding in throwing the trough to the extreme position of its swing, or other suitable means may be provided for oscillating this trough. The raising of the door 11 will give the trough enough momentum to carry it past the horizontal, enabling the weight 10 to throw it in dipping position. The inner end of the trough may be made heavier than the outer end, if desired, to assist this action.

In Figs. 3 and 4 I show another form of my invention, wherein the stationary hood is done away with, the outer portion of the trough being provided with a closed top and with holes 17 in its side, through which project gas-burners 18, having a common supply-pipe 19. This supply-pipe is made of flexible tubing, so that it will allow swinging of the trough, as before. This trough may be either tipped by hand or by any suitable mechanism arranged therefor and will operate in the same manner as the trough in Fig. 1.

The advantages of my invention result from the fact that the slow and troublesome operation of gathering the glass is done away with and the glass fed easily and rapidly into the molds, which may be placed under the outer end of the trough. The operator is protected from the intense heat of the furnace proper, and the arrangement is cheap and effective.

Many changes in the form and arrangement of the parts may be made without departure from my invention, since

What I claim is—

1. A glass-melting furnace, having an opening in its wall, a projecting tilting trough mounted in the opening, and having its inner end arranged to dip the glass from the bath, said trough having a bottom inclining downwardly and outwardly from its inner to its outer end, when tilted into discharging position and means for heating the protruding portion of the trough; substantially as described.

2. A glass-melting furnace, having an opening in its wall, a tilting trough projecting through the opening and having its inner end arranged to dip up glass from the bath, the bottom of the trough being inclined outwardly and downwardly from its inner to its other end when swung into discharging position and a hood inclosing the protruding outer portion of the trough; substantially as described.

3. A glass-melting furnace, having an opening in its walls, a tilting trough mounted in the opening and extending to a point outside the walls, said trough having a bottom inclining downwardly and outwardly from its inner to its outer end, when tilted into discharging position a hood surrounding the protruding portion, a door in the hood arranged to give access to the outer end of the trough, and means for swinging the trough; substantially as described.

4. A glass-melting furnace, having a hole in its wall, a tilting trough mounted therein upon a horizontal axis, a weight mounted on the trough above its axis, and means for heating the outer portion of the trough; substantially as described.

In testimony whereof I have hereunto set my hand.

WILLIAM BUTTLER.

Witnesses:
 FRED WOLTJEN,
 C. L. KERNER.